May 7, 1929.  K. L. HANSEN  1,711,844
DYNAMO ELECTRIC MACHINE
Filed April 27, 1927   2 Sheets-Sheet 1

May 7, 1929.  K. L. HANSEN  1,711,844
DYNAMO ELECTRIC MACHINE
Filed April 27, 1927  2 Sheets-Sheet 2

Inventor:
Klaus L. Hansen
By
Attorneys.

Patented May 7, 1929.

1,711,844

UNITED STATES PATENT OFFICE.

KLAUS L. HANSEN, OF MILWAUKEE, WISCONSIN.

DYNAMO-ELECTRIC MACHINE.

Application filed April 27, 1927. Serial No. 186,941.

This invention relates to dynamo electric machines.

In dynamo electric machines, such for example, as arc welding generators, it is the usual practice to provide a direct current generator with a shunt field and a separately excited field, and to provide also an external inductance and a separate exciter for the separately excited field. This equipment is necessarily expensive as there are numerous devices, as stated above, which accompany the generator and add to the total cost of the welding equipment.

In my Patent No. 1,418,707 of June 6, 1922, for constant current generator for arc welding, I have disclosed a generator in which an auxiliary winding is provided which accentuates the reactance of the circuit and dispenses with the necessity for an outside or extra reactance.

It is apparent that in a machine of this type if the generator could be so constructed that a constant or substantially constant voltage was impressed on a second field in addition to the ordinary shunt field, that the necessity for a separator exciter would be eliminated. By the construction outlined hereinafter it will be apparent that the above desirable result has been accomplished, and therefore a primary object of this invention is to provide a novel form of arc welding generator in which a main field is provided and a second field excited directly from the generator itself and the winding thereof supplied with current at a substantially constant voltage.

Further objects are to provide a novel form of arc welding generator in which the outside reactance is wholly avoided as well as the separate exciter, so that the generator embodies in itself inherently all of the desirable features ordinarily furnished by a plurality of separate instrumentalities, as discussed above.

Further objects are to provide a novel form of arc welding generator in which auxiliary brushes are set in spaced relation to the main brushes and in which the armature reaction is employed to combine with or distort the field furnished jointly by the main winding and the auxiliary winding, so that the total flux between active auxiliary brushes remains approximately constant from no load through full load to short circuit. This, therefore, gives a substantially constant voltage for producing the auxiliary field and thus the necessity of a separate exciter is overcome.

Further objects are to provide a construction such that the difference in voltage between the adjacent commutator bars as they pass the auxiliary brushes is reduced to a minimum so that destructive sparking is wholly avoided.

More specifically, objects of this invention are to provide a novel form of arc welding generator in which interpoles or commutating poles are associated with a reactance and then cooperate with the main poles to provide the necessary reactance for the main circuit, and in which this construction is combined with the auxiliary field and the auxiliary brushes to secure efficient commutation both at the auxiliary brushes and at the main brushes while maintaining a substantially constant voltage at the terminals of the auxiliary field winding.

An embodiment of the invention is shown in the accompanying drawings in which.

Figure 1:
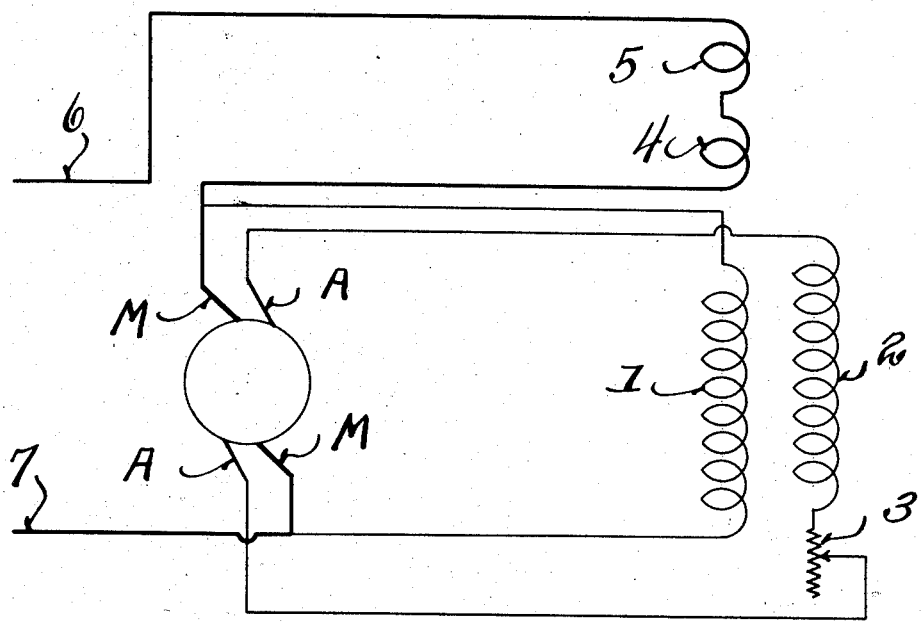
Figure 1 is a diagram of the connections and circuits employed in the machine.
Figure 2:
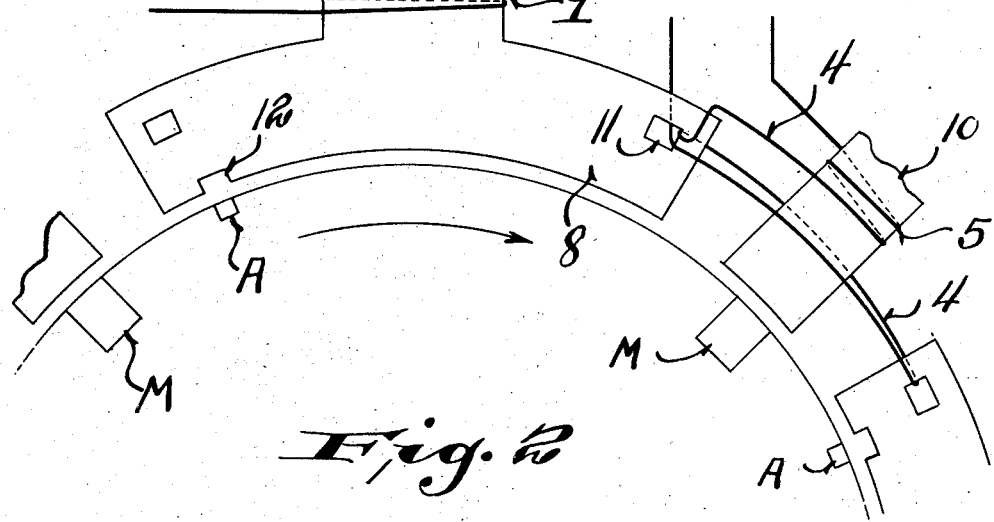
Figure 2 is a schematic view of a portion of the machine showing the windings thereon.

Referring to Figures 1 and 2, it will be seen that the machine is provided with a pair of main brushes M and a pair of auxiliary brushes A. The main brushes M are connected to a shunt coil 1, and the auxiliary brushes A are connected to an auxiliary exciting coil 2 which will hereinafter be referred to as the auxiliary winding. The auxiliary winding is preferably provided with a variable resistance 3 in series therewith, and the shunt winding 1 may be similarly provided, if desired.

The main circuits for the generator includes, in series with the armature, a reactance increasing winding 4, which will hereinafter be referred to as the reactance winding, and an interpole or commutating winding 5. These windings are connected, as stated, in series with the armature and in series with the conductors or load circuits 6 and 7 extending from the machine and leading to the welding electrodes. The mechanical construction of the machine includes a plurality of pole pieces having elongated shoes 8, as shown in Figure 2, and relatively smaller necks 9.

Further, commutating poles or interpoles 10 are provided upon which the windings 5 are placed. It is to be noted also that the poles or pole shoes are provided with apertures 11 adjacent their ends through which the reactance winding 4 is threaded. It is preferable to form these apertures in the pole shoes themselves to secure a large value for the reactance, and also to secure a pronounced effect upon the distribution of flux in the pole shoes. The construction is somewhat similar to that described and illustrated in my prior patent noted above.

Each pole shoe 8 may be provided with a notch or cutout portion 12 adjacent one end below which the auxiliary brush A corresponding thereto is positioned. If a notch is used, the actual flux at the effective conductors short circuited by the brushes A is considerably reduced and the voltage between adjacent commutator bars is substantially zero at the instant of passing the auxiliary brushes. Correct commutation, however, can be secured by using a relatively high number of bars, so that the voltage between adjacent commutator bars is reduced to a relatively low value. The main brushes M are located in proper relation to the commutating poles 10 to secure correct commutation without sparking at the commutating bars. This, of course, is secured by having substantially zero potential between the effective conductors short circuited by the main brushes, and is readily atttained by proportioning and properly designing the commutating poles.

Further, it is to be noted that the reactance winding 4 encloses the commutating poles and increases their strength, so that the commutating windings may have fewer turns. The effect of the reactance winding is to greatly increase the reactance of the main circuit, and as a secondary effect, to enhance the action of the commutating poles, so that the commutating windings need be of a lesser number of turns.

It is to be noted particularly that the auxiliary brushes A are not detrimental to the correct commutation of the machine, but work without sparking and without short circuiting any adjacent commutator bars having a material difference of potential between them.

The action of the machine will be most readily understood by reference to Figures 3 and 4, which will be discussed in detail herewith.

Figure 3:
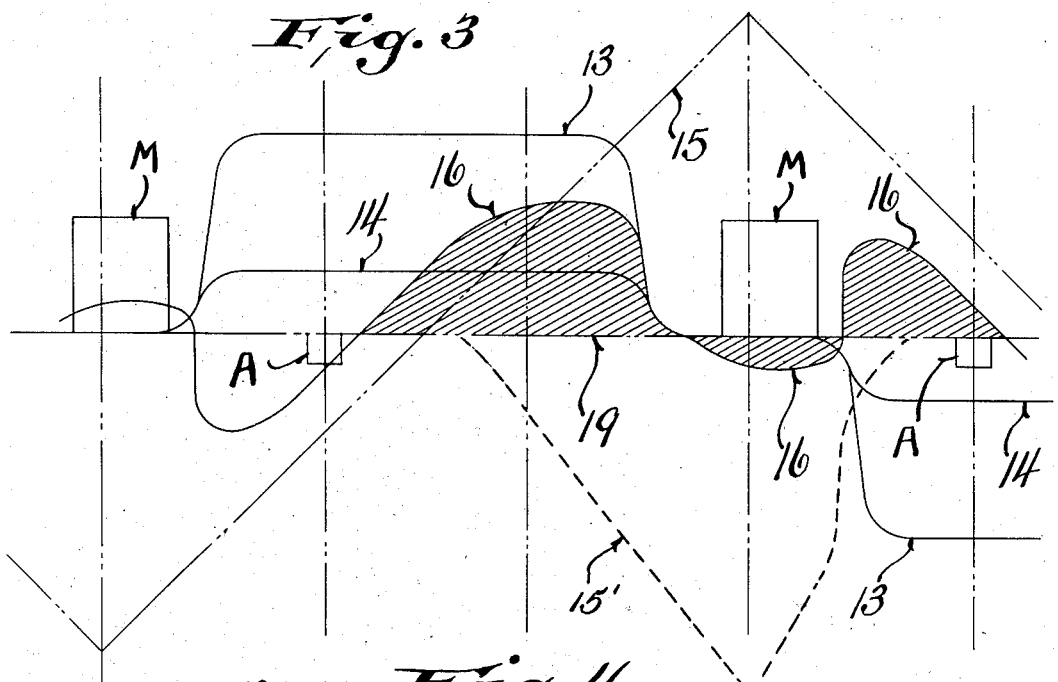
Figure 3 illustrates a series of curves showing the action of the machine under load.
Figure 4:
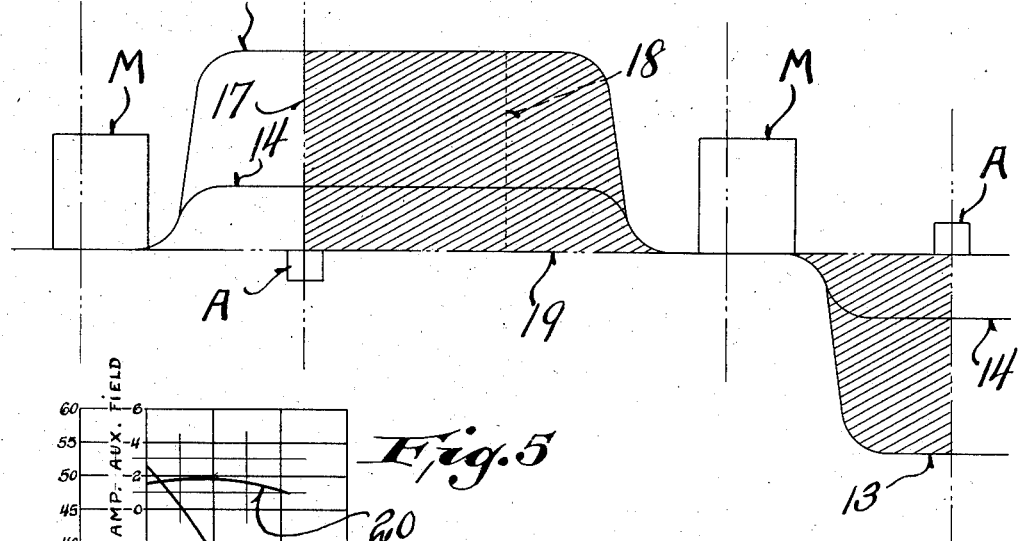
Figure 4 is a corresponding view showing the machine at no load.

Referring to Figures 3 and 4, it will be seen that a series of curves have been given for illustrating the action of the machine. The curve 13 indicates the flux produced jointly by the main field winding and the auxiliary field winding, such flux being also influenced by the interpole or communicating pole winding and the reactance winding, as shown. This flux, as stated, is made up jointly by the action of the main field and the auxiliary field. The portion of the flux furnished by the auxiliary field is indicated by the curve 14.

When short circuiting occurs, it is clear that the flux produced by the main field will drop to approximately zero. This invention, however, provides for a substantially constant M. M. F. from the auxiliary winding 2. This is accomplished by utilizing the armature reaction and combining it with the field flux in a novel manner. The flux due to the armature reaction is indicated by the curve 15. The flux produced by the interpole winding 5 and the reactance winding 4 is indicated in an average condition, approximately by the dotted curve 15′, and its unsymmetrical shape is due both to the shape of the main poles and the difference in permeability in the main poles due to the flux distortion produced by the winding 4.

Assume now that the external circuit of the dynamo is short circuited or has substantially no resistance in it. Under these conditions, the three fluxes produced by the auxiliary winding 2, the armature reaction, and the windings 4 and 5, respectively indicated in Figure 3 by the reference characters 14, 15, and 15′, will combine to produce the distribution of flux indicated by the curve 16. It is clear that the flux effectively included between the auxiliary brushes A is that shown by the shaded portion of Figure 3. If the algebraic sum of this flux is equal to the algebraic sum of the flux effective between the auxiliary brushes at open circuit or no load, it is clear that the voltage impressed on the auxiliary winding, that is to say, the voltage at the auxiliary brushes, will remain substantially constant and consequently the current flow and M. M. F. of the auxiliary winding will be substantially constant.

Figure 4 shows the curves 13 and 14 and the shaded area under the curve 13 between the auxiliary brushes A shows the effective flux between such brushes. It is clear from a comparison of Figures 3 and 4 that the algebraic sum of the flux effected between the auxiliary brushes under the condition shown in Figure 4 and corresponding to no load, is the difference between the two shaded areas, that is to say, is the shaded area under the curve 13 between the lines 17 and 18 (see Figure 4). This shaded area is approximately equal to the algebraic sum of the shaded area included between the curve 16, Figure 3, and the zero line 19, and consequently the voltage at the auxiliary brushes is substantially constant. Clearly, therefore, the current flow through the auxiliary winding is also substantially constant, and thus the M. M. F. produced by such auxiliary field winding is substantially constant.

Figure 5:
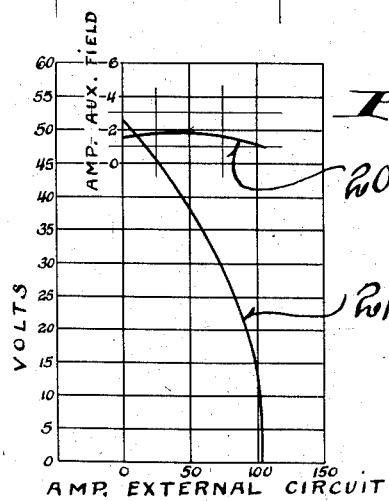
Figure 5 shows pairs of curves, one of which illustrates the volt ampere of external characteristics of the machine, and the other of which shows the current flow through the auxiliary exciting winding.

Thus, it is immediately apparent that the machine functions identically as if the auxiliary field winding were supplied from a separate exciter and the desirable drooping external characteristics of the arc welding machine without any reentrant portion is obtained, as shown in Figure 5.

From actual tests conducted with a machine constructed in exact accordance with this disclosure, these results have been obtained.

Figure 5 shows the result of a test on a machine constructed in accordance with this disclosure. The curve 20 shows the current flow through the auxiliary field winding from no load through short circuit, and it is, therefore, seen that this curve is almost a straight line or, in other words, is substantially flat. The current flow through this winding had an average variation of approximately one-half an ampere, as shown by the scale indicating the current in the auxiliary field winding in Figure 5. It is to be noted particularly that these results were obtained through a range from no load to short circuit. The external characteristic curve is given, as indicated at 21, and shows the desirable drooping characteristics without reentrant portions so much desired in arc welding generators. This curve shows clearly that a stable arc can be obtained from this machine, although no separate exciter is employed and no external reactance.

It is to be noted also that even at approximately short circuit that the resulting flux indicated by the curve 16 is approximately zero at the auxiliary brushes A.

It will be seen that a novel form of dynamo electric machine has been provided by this invention which is so constructed that an auxiliary or separate exciter is not needed, but is wholly dispensed with.

Further, it will be seen that no external reactance is required in the smooth and perfect operation of the arc welding generator. Therefore, it is apparent that a novel form of dynamo electric machine has been provided by this invention whose inherent characteristics give the effect of a separately excited arc welding generator with a high reactance in the arc welding circuit and with a shunt field as well as the auxiliary field, which latter corresponds to an externally excited field in its action in the machine. These characteristics are also combined with those of an interpole machine and provide perfect commutation at the main brushes and also with such characteristics as provide perfect commutation at the auxiliary brushes.

Further, it will be seen that a dynamo electric machine has been provided having the characteristics above and in which the current flow in the auxiliary field winding is substantially constant from full load through short circuit.

Although the invention has been described in considerable detail, such description is intended as illustrative rather than limiting as the invention may be variously embodied and as the scope of such invention is to be determined as claimed.

I claim:

1. A dynamo electric machine having an armature, commutating means including main and auxiliary brushes, main field poles, main field coils supplied from the main brushes, auxiliary field coils supplied from the auxiliary brushes, one of each of said main and auxiliary coils being positioned on each of said main field poles, said auxiliary brushes being set to utilize the armature reaction to maintain a substantially constant current through the auxiliary field coil from no load to short circuit, whereby a self-excited machine is provided which has the characteristics of a machine provided with a self-excited and separately excited field coil.

2. A dynamo electric machine comprising $n$ field poles, windings thereon, an armature wound for $n$ poles, commutating means for supplying a work circuit and for supplying said winding, said commutating means consisting of two groups of instrumentalities one of such groups supplying the work circuit with current at varying voltages and the other of such groups supplying said field windings with current at substantially constant voltage.

3. A unitary self-exciting dynamo electric machine comprising a field structure having main poles, an armature, a main field coil and an auxiliary field coil on each of said main poles, means for supplying current to said main field coil at widely varying voltages, and means for maintaining a substantially constant voltage at the terminals of said auxiliary field coil.

4. A unitary self-exciting dynamo electric machine comprising field poles, an armature, commutating means including diametrically opposed main brushes and diametrically opposed auxiliary brushes, a main field winding, work circuit supply conductors leading from said main brushes, said main field coil having its terminals connected to the main brushes, said auxiliary field coil having its terminals connected solely to the auxiliary brushes, said auxiliary brushes being shifted from neutral position to a point at which a substantially constant voltage is maintained at the auxiliary brushes from no load to short circuit.

5. A unitary self-exciting dynamo electric machine comprising field poles, an armature, connecting means including diametrically opposed main bushes and diametrically opposed auxiliary brushes, a main field winding, work circuit supply conductors leading from said main brushes, said main field coil having its terminals connected to the main brushes, said auxiliary field coil having its terminals connected solely to the auxiliary brushes, said auxiliary brushes being shifted from neutral position to a point at which a substantially constant voltage is maintained at the auxiliary brushes from no load to short circuit, said field poles having cutout portions adjacent the armature coil commutated by the auxiliary brushes.

6. A unitary self-exciting dynamo electric machine comprising field poles, an armature, commutating means including diametrically opposed main brushes and diametrically opposed auxiliary brushes, a main field winding, work circuit supply conductors leading from said main brushes, said main field coil having its terminals connected to the main brushes, said auxiliary field coil having its terminals connected to the auxiliary brushes, said auxiliary brushes being shifted from neutral position to a point at which a substantially constant voltage is maintained at the auxiliary brushes from no load to short circuit, commutating poles, commutating windings upon said commutating poles, and reactance increasing windings embedded in said main poles, said commutating windings and said reactance increasing windings being connected in series with said main brushes.

7. A unitary self-exciting dynamo electric machine comprising main field poles, all of said field poles being identical, an armature, commutating means including main brushes and auxiliary brushes, a main field winding, work circuit supplying conductors leading from said main brushes, said main field coil having its terminals connected to the main brushes, said auxiliary field coil having its terminals connected to the auxiliary brushes, said auxiliary brushes being shifted from neutral position to a point less than ninety electrical degrees and maintaining a substantially constant voltage at the terminals of the auxiliary winding.

8. A dynamo electric machine comprising main field poles, an armature, commutating means including main brushes and auxiliary brushes, a main field winding supplied from said main brushes, an auxiliary field winding supplied from said auxiliary brushes, said auxiliary brushes being shifted from neutral position to a point at which a substantially constant voltage is maintained at the auxiliary brushes from no load to short circuit, said field poles having cutout portions adjacent the armature coils commutated by the auxiliary brushes, commutating poles located between said field poles, commutating windings upon said commutating poles and reactance increasing windings embedded in said main poles and surrounding said commutating poles, said commutating windings and said reactance increasing windings being connected in series with said main brushes.

9. A dynamo electric machine comprising main field poles, an armature, commutating means including main brushes and auxiliary brushes, a main field winding supplied from said main brushes, an auxiliary field winding supplied solely from said auxiliary brushes, said auxiliary brushes being shifted from neutral position to a point at which a substantially constant voltage is maintained at the auxiliary brushes from no load to short circuit, said field poles having cut out portions adjacent the armature coils commutated by the auxiliary brushes, commutating poles located between said field poles, commutating windings upon said commutating poles, said commutating windings being connected in series with said main brushes.

In testimony that I claim the foregoing I have hereunto set my hand at Milwaukee, in the county of Milwaukee and State of Wisconsin.

KLAUS L. HANSEN.